US011823048B1

United States Patent
Bai

(10) Patent No.: US 11,823,048 B1
(45) Date of Patent: *Nov. 21, 2023

(54) GENERATING SIMULATED TRAINING EXAMPLES FOR TRAINING OF MACHINE LEARNING MODEL USED FOR ROBOT CONTROL

(71) Applicant: GOOGLE LLC, Mountain View, CA (US)

(72) Inventor: Yunfei Bai, Fremont, CA (US)

(73) Assignee: GOOGLE LLC, Mountain View, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/979,565

(22) Filed: Nov. 2, 2022

Related U.S. Application Data

(63) Continuation of application No. 15/835,357, filed on Dec. 7, 2017, now Pat. No. 11,494,632.

(51) Int. Cl.
  *G06N 3/08* (2023.01)
  *G05B 13/02* (2006.01)
  *B25J 9/16* (2006.01)
  *G06N 3/04* (2023.01)

(52) U.S. Cl.
  CPC ............... *G06N 3/08* (2013.01); *B25J 9/163* (2013.01); *B25J 9/1612* (2013.01); *G05B 13/027* (2013.01); *G06N 3/04* (2013.01)

(58) Field of Classification Search
  CPC .. G06N 3/08; G06N 3/04; B25J 9/1612; B25J 9/163; G05B 13/027

USPC .......................................................... 706/12
See application file for complete search history.

(56) References Cited

U.S. PATENT DOCUMENTS 10,131,053 B1\* 11/2018 Sampedro .............. B25J 9/1666
2019/0232488 A1\* 8/2019 Levine ................. G05B 19/042

OTHER PUBLICATIONS

Koos, S., et al.; Crossing the Reality Gap in Evolutionary Robotics by Promoting Transferable Controllers; 12th Annual Conference on Genetic and Evolutionary Computation; 9 Pages; UA; dated 2010.
Kehoe et al. "A Survey of Research on Cloud Robotics and Automation." IEEE Transactions on Automation Science and Engineering 12, No. 2 (2015): 398-409.
Bongard, J. et al. (2004). Once more unto the breach: Co-evolving a robot and its simulator. In Proceedings of the Ninth International Conference on the Simulation and Synthesis of Living Systems (ALIFE9) (pp. 57-62).

(Continued)

*Primary Examiner* — Charlotte M Baker
(74) *Attorney, Agent, or Firm* — Gray Ice Higdon

(57) ABSTRACT

Implementations are directed to generating simulated training examples for training of a machine learning model, training the machine learning model based at least in part on the simulated training examples, and/or using the trained machine learning model in control of at least one real-world physical robot. Implementations are additionally or alternatively directed to performing one or more iterations of quantifying a "reality gap" for a robotic simulator and adapting parameter(s) for the robotic simulator based on the determined reality gap. The robotic simulator with the adapted parameter(s) can further be utilized to generate simulated training examples when the reality gap of one or more iterations satisfies one or more criteria.

20 Claims, 7 Drawing Sheets

(56) References Cited

OTHER PUBLICATIONS

Jakobi, N. et al. (1995). Noise and the reality gap: The use of simulation in evolutionary robotics. Advances in artificial life, 704-720.
Laue, T. et al. (Jul. 2008). Automatic Parameter Optimization for a Dynamic Robot Simulation. In RoboCup (pp. 121-132).
Mitash, C. et al. (2017). A Self-supervised Learning System for Object Detection using Physics Simulation and Multi-view Pose Estimation. arXiv preprint arXiv:1703.03347. 7 pages.

* cited by examiner

| REAL = NOT SUCCESFUL & SIM = NOT SUCCESFUL <br><br> A | REAL = NOT SUCCESFUL & SIM = SUCCESFUL <br><br> B |
|---|---|
| REAL = SUCCESFUL & SIM = NOT SUCCESFUL <br><br> C | REAL = SUCCESFUL & SIM = SUCCESFUL <br><br> D |

REALITY MEASURE = (A+D)/(A+B+C+D)

FIG. 4

GENERATING SIMULATED TRAINING EXAMPLES FOR TRAINING OF MACHINE LEARNING MODEL USED FOR ROBOT CONTROL

BACKGROUND

Various machine learning based approaches to robotic control have been proposed. Some of those approaches train a machine learning model (e.g., a deep neural network) that can be utilized generate one or more predictions that are utilized in control of a robot, and train the machine learning model using training examples that are based only on data from real-world physical robots. However, these and/or other approaches can have one or more drawbacks. For example, generating training examples based on data from real-world physical robots requires heavy usage of one or more physical robots in generating data for the training examples. This can be time-consuming (e.g., actually attempting a large quantity of grasps requires a large quantity of time), can consume a large amount of resources (e.g., power required to operate the robots), can cause wear and tear to the robots being utilized, and/or can require a great deal of human intervention.

In view of these and/or other considerations, use of robotic simulators has been proposed to generate simulated robot data that can be utilized in generating simulated training examples that can be utilized in training of the machine learning models. However, there is often a meaningful "reality gap" that exists between real robots and real environments—and the simulated robots and/or simulated environments simulated by a robotic simulator. This can result in generation of simulated training examples that do not accurately reflect what would occur in a real environment. This can affect performance of machine learning models trained on such simulated training examples and/or can require a significant amount of real world training examples to also be utilized in training to help mitigate the reality gap.

SUMMARY

Implementations disclosed herein relate to generating simulated training examples for training of a machine learning model, training the machine learning model based at least in part on the simulated training examples, and/or using the trained machine learning model in control of real-world physical robot(s). Disclosed implementations additionally or alternatively relate to performing one or more iterations of quantifying a "reality gap" for a robotic simulator and adapting parameter(s) for the robotic simulator based on the determined reality gap. Some of those implementations further relate to using the robotic simulator with adapted parameter(s) to generate simulated training examples (used for training a machine learning model) when the reality gap of one or more iterations satisfies one or more criteria. The simulated training examples are based on generated output from the robotic simulator (with the adapted parameters) when the robotic simulator is utilized to cause simulated robot(s) to interact with a simulated environment. One or more instances of the robotic simulator can be utilized to generate the simulated training examples, and the instances can each execute on one or more computing devices. The machine learning model trained based on simulated training examples can be, for example, used in controlling a real physical robot during performance of one or more tasks, such as robotic grasping and/or other robotic manipulation task(s). For instance, the trained machine learning model can be utilized in servoing of an end effector in performance of a robotic grasping task.

As used herein, the "reality gap" is a difference that exists between real robots and real environments—and simulated robots and simulated environments simulated by a robotic simulator. Implementations disclosed herein present various techniques for quantifying the reality gap for a robotic simulator, and adapting parameter(s) of the robotic simulator in response to determining that the quantified reality gap fails to satisfy one or more criteria (e.g., the quantified reality gap is more significant than desired). In some of those implementations, multiple iterations of quantifying the reality gap and adapting parameter(s) of a robotic simulator are performed, until it is determined that the reality gap achieved with certain parameter(s) satisfies the one or more criteria. In some versions of those implementations, the robotic simulator can then be utilized, with the certain parameter(s), to generate simulated training examples. The simulated training examples can then be utilized to train one or more machine learning models that can be utilized in control of various real robots.

In some of those implementations, the reality gap is quantified based on performing, using a robotic simulator, multiple simulated episodes of attempting performance of a robotic task (e.g., a grasping task). The simulated episodes are performed in view of episode data instances from corresponding real world instances of one or more real robots attempting performance of the robotic task. For example, a simulated episode can configure an initial state of a simulated environment based on a detected initial state of a corresponding real world instance. For instance, the simulated environment for a simulated episode can be configured using pose(s) for simulated environmental object(s) that conform to determined pose(s) for corresponding real world environmental object(s) for the corresponding real world instance. Further, the simulated episode can control the simulated robot to traverse a simulated trajectory that is based on a real world trajectory traversed by the real robot in the corresponding real world instance (e.g., the real world trajectory can be determined based on data from position sensors for actuators of the real robot during the real world instance).

A simulated success measure can be determined for each of the simulated episodes, and a reality gap quantified based on comparing the simulated success measures to real world success measures for the corresponding real world instances. Each simulated success measure indicates a degree of success of the robotic task for the corresponding simulated episode. Each real world success measure indicates a degree of success of the robotic task for the corresponding real world instance. For example, for a grasping task, the success measures can be either a first "successful" value (i.e., an object was grasped) or a second "unsuccessful" value (i.e., an object was not grasped). Also, for example, for a button pushing task, the success measures can be either a first "successful" value (i.e., the button was pushed) or a second "unsuccessful" value (i.e., the button was not pushed).

In some implementations, the reality gap is quantified as a reality measure that is based on comparison of simulated and real world success measures that "agree" to simulated and real world success measures that "disagree". For example, a "minimal" reality measure (indicating a "minimal" reality gap) can be determined if the success measure for each of the simulated episodes matched the success measure for their corresponding real world instance. For instance, for a grasping task, if each "successful" grasp for the real world instances is also successful for their corresponding simulated episodes, and if each "unsuccessful" grasp for the real world instances is also unsuccessful for their corresponding simulated episodes, a "minimal" reality measure can be determined. In contrast, if a large quantity "successful" grasps for the real world instances were "unsuccessful" for their corresponding simulated episodes, and/or if a large quantity of "unsuccessful" grasps for the real world instances were "successful" for the corresponding simulated episodes, a reality measure indicative of a higher reality gap would be determined. In various implementations, a reality measure can be determined utilizing a "confusion matrix" that indicates the agreement/disagreement between real and simulated success measures. In these and other manners, the reality measures determined herein can be based on comparison of task-level outcomes for real-world episodes that attempt performance of a robotic task and their corresponding simulated episodes that also attempt performance of the robotic task based on corresponding real-world episodes. Such comparison of the task-level outcomes can provide a quantifiable indication of the overall reality gap that is accurate and that can be computationally efficient to determine.

As mentioned above, when the reality measure fails to satisfy a threshold, one or more parameters of the robotic simulator are modified. Various parameters can be modified such as simulated robot parameters of the simulated robot and/or simulated environmental parameters that dictate one or more properties of one or more simulated environmental objects. Simulated robot parameters can include, for example, friction coefficients for simulated gripper(s) of the simulated robot, modeling (e.g., number of joint(s)) of simulated gripper(s) of the simulated robot, control parameter(s) for the simulated gripper(s), control parameter(s) for simulated actuator(s) of simulated the robot, etc. Simulated environmental parameters can include, for example, friction coefficient(s) for simulated environmental object(s), size and/or pose of fixed simulated environmental object(s), model(s) utilized in rending simulated environmental object(s), etc. The various parameters can be adapted manually (e.g., based on input from a human) and/or utilizing one or more automated techniques, such as derivative free optimization (e.g., CMA-ES and/or Bayesian optimization).

As also mentioned above, multiple iterations of quantifying the reality gap and adapting parameter(s) of a robotic simulator can be performed, until it is determined that the reality gap achieved with certain parameter(s) satisfies a threshold and/or other criterion/criteria. In some of those implementations, the robotic simulator can then be utilized, with the certain parameter(s), to generate simulated training examples. The simulated training examples can be utilized to train one or more machine learning models that can be utilized in control of various real robots. The one or more machine learning models can optionally also be trained based on real training examples generated based on output from one or more real physical robots. Notably, in various implementations, a lesser quantity of (or no) real training examples can be utilized as a result of improved (e.g., more realistic) simulated training examples that are generated by the robotic simulator. The simulated training examples are improved as a result of the certain parameter(s) utilized by the robotic simulator being adapted based on the quantified reality gap according to techniques described herein. Utilizing a lesser quantity of real training examples can reduce resources that would otherwise be consumed by real-world physical robots in generating a greater quantity of real training examples, can cause less wear and tear to real-world physical robots as a result of generating a lesser quantity of (or not) real training examples, can lead to an increase in time-efficiency in generating training examples (e.g., simulated episodes can be performed in less clock on the wall time than real-world episodes), and/or can achieve additional and/or alternative benefits. Moreover, use of the improved (e.g., more realistic) simulated training examples in training one or more machine learning models leads to improved performance of task(s) (e.g., a higher success rate for the task(s)) by a real robot that utilizes the machine learning model(s) in performance of the task(s). In other words, bridging the reality gap according to various techniques disclosed herein can mitigate sim-to-real transfer problems and lead to improved performance of real robots that utilize machine learning model(s) trained according to techniques disclosed herein.

The above description is provided as an overview of some implementations of the present disclosure. Further description of those implementations, and other implementations, are described in more detail below.

In some implementations, a method is provided that includes accessing real episode data instances stored in one or more computer-readable media. Each of the real episode data instances is generated based on performance of a corresponding real episode of a robotic task by a corresponding real robot to cause the corresponding real robot to traverse a corresponding trajectory and attempt to interact with one or more corresponding environmental objects in attempting performance of the robotic task. Each of the real episode data instances includes: trajectory data that defines the corresponding trajectory traversed by the corresponding real robot during the real episode; environmental data that defines at least a beginning environmental state for each of the one or more corresponding environmental objects at a beginning of the real episode; and a real episode success measure that indicates a degree of success of the robotic task for the real episode. The method further includes performing, using a robotic simulator with current parameters, simulated episodes of attempting performance of the robotic task based on the real episode data instances of a group of the real episodes. During each of the simulated episodes, a simulated environment is configured based on the environmental data of a corresponding one of the real episode data instances of the group, and a simulated robot is controlled to traverse a simulated trajectory to attempt performance of the robotic task. The simulated trajectory is based on the trajectory data of the corresponding one of the real episode data instances of the group. The method further includes determining, for each of the simulated episodes, a simulated episode success measure that indicates a degree of success of the robotic task for the simulated episode. The method further includes determining a reality measure for the simulated episodes based on comparison of the simulated episode success measures and the real episode success measures for the real episodes of the group. The method further includes determining whether the reality measure satisfies one or more criteria. When it is determined that the reality measure fails to satisfy the one or more criteria, the method further includes modifying one or more of the current parameters for the robotic simulator. When it is determined that the reality measure satisfies the threshold, the method further includes: performing, using the robotic simulator with the current parameters, new simulated episodes that are not based on the episode data instances; generating simulated training data based on the new simulated episodes; and transmitting the simulated training data for training of a machine learning model based on the simulated training data.

These and other implementations of the technology may include one or more of the following features.

In some implementations, the method further includes performing, prior to the simulated episodes of the robotic task based on the real episode data instances of the group, one or more prior simulated episodes of attempting performance of the robotic task using the robotic simulator. Each of the prior simulated episodes is based on a corresponding real episode data instance of a prior group of the real episodes. In those implementations, the method further includes: determining, for the prior simulated episodes, a prior reality measure based on comparison of prior simulated success measures for the prior simulated episodes and the real episode success measures for the real episodes of the prior group; and in response to determining that the prior reality measure fails to satisfy the one or more criteria, modifying prior parameters of the robotic simulator to generate the current parameters used in performing the simulated episodes based on the real episode data instances of the group of the real episodes. In some of those implementations, modifying the prior parameters for the robotic simulator includes modifying one or more simulated robot parameters of the simulated robot and/or modifying one or more environmental parameters that that dictate one or more properties of one or more simulated environmental objects simulated by the robotic simulator. The robot parameter(s) can include, as one example, a gripper parameter that dictates simulated control of a simulated gripper of the simulated robot simulated by the robotic simulator. The one or more properties of the one or more simulated environmental objects can include, for example, friction coefficients.

In some implementations, the method further includes training the machine learning model based on the simulated training data. In some of those implementations, the method further includes: processing robot data using the trained machine learning model to generate a predicted output, where the robot data is based on output from one or more sensors of an additional real robot; and controlling the additional real robot based on the predicted output.

In some implementations, determining the reality measure for the simulated episodes includes generating a confusion matrix that is based on the simulated success measures for the simulated episodes and the real success measures.

In some implementations, the simulated success measures for the simulated episodes are each one of two values and the episode success measures of the group of the episodes are each one of the two values, where a first value of the two values indicates success of the robotic task and a second value of the two values indicates failure of the robotic task.

In some implementations, the real episodes and the simulated episodes are performed without use of the machine learning model.

In some implementations, a method is provided that includes controlling one or more real physical robots to cause the real physical robots to perform multiple episodes of a robotic task. During each of the episodes a corresponding real physical robot traverses a corresponding trajectory and attempts to interact with one or more corresponding environmental objects in attempting performance of the robotic task. The method further includes storing, in one or more computer-readable media, an episode data instance for each of the episodes. Each of the episode data instances includes: trajectory data that defines the corresponding trajectory traversed by the real physical robot during the episode, environmental data that defines at least a beginning environmental state for each of the one or more corresponding environmental objects at a beginning of the episode, and an episode success measure that indicates a degree of success of the robotic task for the episode. The method further includes performing, using a robotic simulator, simulated episodes of attempting performance of the robotic task based on the episode data instances of a group of the episodes. During each of the simulated episodes: a simulated environment is configured based on the environmental data of a corresponding one of the episode data instances of the group, and a simulated robot is controlled to traverse a simulated trajectory to attempt performance of the robotic task. The simulated trajectory is based on the trajectory data of the corresponding one of the episode data instances of the group. The method further includes determining, for each of the simulated episodes, a simulated episode success measure that indicates a degree of success of the robotic task for the simulated episode. The method further includes determining a reality measure for the simulated episodes based on comparison of the simulated episode success measures for the simulated episodes and the episode success measures of the group of the episodes. The method further includes determining that the reality measure fails to satisfy a threshold, and modifying one or more parameters for the robotic simulator in response to determining that the reality measure fails to satisfy the threshold. The method further includes performing, using the robotic simulator with the modified one or more parameters, additional simulated episodes of attempting performance of the robotic task based on the episode data instances of an additional group of the episodes. The method further includes determining, for each of the additional simulated episodes, an additional simulated episode success measure that indicates a degree of success of the robotic task for the additional simulated episode. The method further includes determining an additional reality measure for the additional simulated episodes based on comparison of the additional simulated episode success measures for the additional simulated episodes and the episode success measures of the additional group of the episodes. The method further includes determining that the additional reality measure satisfies a threshold, and in response to determining that the additional reality measure satisfies the threshold: performing, using the robotic simulator with the modified one or more parameters, new simulated episodes that are not based on the episode data instances; generating simulated training examples based on the new simulated episodes; training a machine learning model based on the simulated training examples; and providing the trained machine learning model for use in control of one or more additional real physical robots.

These and other implementations of the technology may include one or more of the following features.

In some implementations, the method further includes performing, prior to the simulated episodes of the robotic task based on the data instances of the group, one or more prior simulated episodes of attempting performance of the robotic task using the robotic simulator. Each of the prior simulated episodes is based on a corresponding prior group of the episodes. In those implementations, the method further includes determining, for each of the one or more prior simulated episodes, a corresponding prior reality measure—and performing the simulated episodes of the robotic task based on the data instances of the group includes performing the simulated episodes with one or more of the parameters for the robotic simulator as previously modified in response to determining that the prior reality measures failed to satisfy the threshold.

In some implementations, modifying the one or more parameters for the robotic simulator includes modifying one or more simulated robot parameters of the simulated robot and/or modifying one or more environmental parameters that dictate one or more properties of one or more simulated environmental objects simulated by the robotic simulator.

In some implementations, the environmental data of each of the episode data instances further defines an ending environmental state for each of the one or more corresponding environmental objects at the end of the episode, and determining the reality measure for the simulated episodes is further based on comparison of: the ending environmental states of a set of the episodes of the group, and simulated ending environmental states for the simulated episodes that correspond to the episodes of the set.

In some implementations, the episodes of the group are the same as the episodes of the additional group.

In some implementations, the method further includes: generating real training examples based on the episodes of the robotic task, or based on additional real physical robot episodes of the robotic task; and training the machine learning model further based on the real training examples. In some of those implementations, the method further includes utilizing the trained machine learning model to control an additional real physical robot, of the one or more additional real physical robots.

In some implementations, the episodes, the simulated episodes, and the additional simulated episodes are performed without use of the machine learning model.

In some implementations, a method is provided that includes accessing episode data instances stored in one or more computer-readable media. Each of the episode data instances is generated based on performance of a corresponding episode of a robotic task by a corresponding real physical robot to cause the corresponding real physical robot to traverse a corresponding trajectory and attempt to interact with one or more corresponding environmental objects in attempting performance of the robotic task. Each of the episode data instances includes data for simulating the episode and an episode success measure that indicates a degree of success of the robotic task for the episode. The method further includes performing, using a robotic simulator, simulated episodes of attempting performance of the robotic task based on the episode data instances of a group of the episodes. The method further includes determining, for each of the simulated episodes, a simulated episode success measure that indicates a degree of success of the robotic task for the simulated episode. The method further includes determining a reality measure for the simulated episodes based on comparison of the simulated episode success measures for the simulated episodes and the episode success measures of the group of the episodes. The method further includes determining that the reality measure fails to satisfy a threshold, and modifying one or more parameters for the robotic simulator in response to determining that the reality measure fails to satisfy the threshold. The method further includes performing, using the robotic simulator with the modified one or more parameters, additional simulated episodes of attempting performance of the robotic task based on the episode data instances of an additional group of the episodes. The method further includes determining, for each of the additional simulated episodes, an additional simulated episode success measure that indicates a degree of success of the robotic task for the additional simulated episode. The method further includes determining an additional reality measure for the additional simulated episodes based on comparison of the additional simulated episode success measures for the additional simulated episodes and the episode success measures of the additional group of the episodes. The method further includes determining that the additional reality measure satisfies a threshold, and in response to determining that the additional reality measure satisfies the threshold: using the robotic simulator, with the modified one or more parameters, for one or more additional purposes.

In some implementations, the one or more additional purposes includes using the robotic simulator with the modified one or more parameters to generate simulated training data for training of a machine learning model.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates one example of determining a reality measure.

DETAILED DESCRIPTION

Training of machine learning models that are robust and accurate, and that can be utilized for control of real-world physical robots, is often limited by the scalability of using real-world physical robots to generate a sufficient quantity of training examples and/or to generate training examples that are sufficiently diverse. For example, for many challenging manipulation tasks, repeatedly running robot experiments to collect training data is infeasible in the real world. Implementations described herein present techniques for adapting parameter(s) of a robotic simulator to reduce the reality gap between the robotic simulator and real-world physical robot(s) and/or a real-world environment. The robotic simulator with the adapted parameters can then be used in generating simulated training examples. The simulated training examples can be used in training of one or more machine learning models that can be used in the control of real-world physical robots. The simulated training examples generated using the robotic simulator with the adapted parameters can be improved (e.g., more realistic) relative to simulated training examples using a robotic simulator without parameters adapted according to implementations described herein. This can enable training of a robust and/or accurate machine learning model using the simulated training examples, while reducing a quantity of real-world training examples that are also utilized in training the machine learning model—or even eliminating the need for use of real-world training examples in training of the machine learning model.

Figure 1:
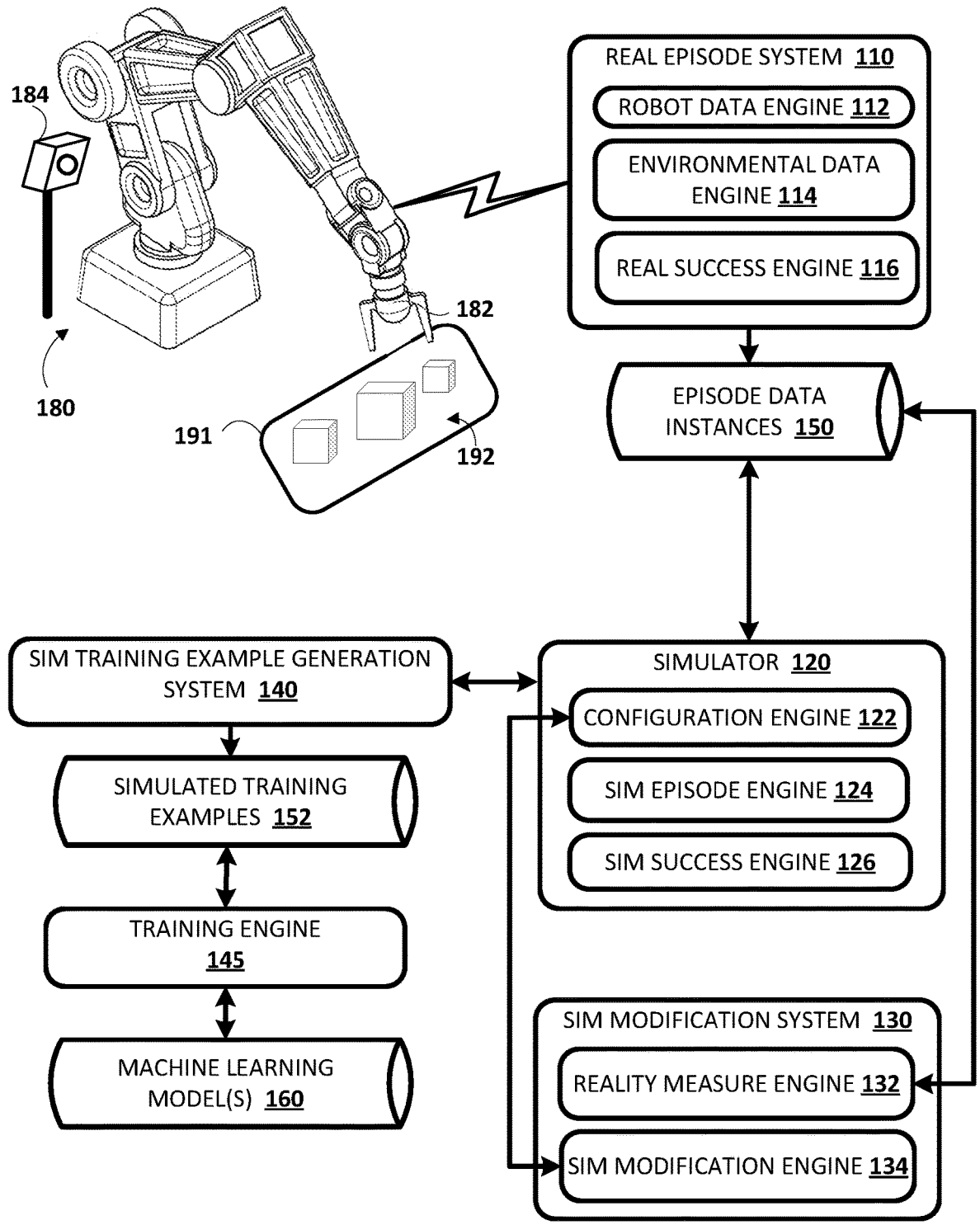
FIG. 1 illustrates an example environment in which implementations described herein can be implemented.

Turning now to the figures, FIG. 1 illustrates an example environment in which implementations described herein can be implemented. FIG. 1 includes an example robot 180, a real episode system 110, a robotic simulator 120, a simulator (sim) modification system 130, a simulator (sim) training example generation system 140, and a training engine 145. Also included are episode data instances 150, simulated training examples 152, and one or more machine learning models 160.

Robot 180 is a "robot arm" having multiple degrees of freedom to enable traversal of grasping end effector 182 along any of a plurality of potential paths to position the grasping end effector 182 in desired locations. Robot 180 further controls two opposed "claws" of grasping end effector 182 to actuate the claws between at least an open position and a closed position (and/or optionally a plurality of "partially closed" positions).

Example vision component 184 is also illustrated in FIG. 1. In FIG. 1, vision component 184 is adjacent to the robot 180, but is not physically coupled to the robot 180. The vision component 184 can be adjustable. For example, the pose (e.g., pan and/or tilt) of the vision component 184 can be adjusted and/or a field of view, capture rate, and/or other properties of the vision component 184 can be adjusted. In other implementations, the vision component 184 can alternatively be physically coupled to the robot 180. For example, the vision component 184 can be mounted on a link of the robot 180, and the pose of the vision component 184 can therefore change as the pose of that link moves. Further, in those examples the vision component 184A can also optionally independently adjust its pose relative to that link (e.g., pan and/or tilt). Vision component 184 includes one or more sensors and generates data frames (e.g., images or point clouds) related to shape, color, depth, and/or other features of object(s) that are in the line of sight of the sensor(s). The vision component 184 can be, for example, a monographic camera (e.g., generating 2D RGB images), a stereographic camera (e.g., generating 2.5D RGB images), and/or a laser scanner (e.g., generating a 2.5D "point clouds").

The vision component 184 has a field of view of at least a portion of the workspace of the robot 180, such as the portion of the workspace that includes container 191 and objects 192 that are contained within the container 191. In FIG. 1, the container 191 is a single tray and the objects 192 include three blocks. However, other environmental object(s) can be included in addition to and/or in lieu of those illustrated in the example of FIG. 1. For example, additional and/or alternative objects 192 can be included such as a spatula, a stapler, a pencil, plates, and/or any other objects. Also, for example, more containers and/or no containers could be provided, and/or alternative work surface(s) could be provided such as table(s), shelves, etc. Also, although a particular robot 180 is illustrated in FIG. 1, additional and/or alternative robots may be utilized, including additional robot arms that are similar to robot 180, robots having other robot arm forms, robots having a humanoid form, robots having an animal form, robots that move via one or more wheels, an unmanned aerial vehicle ("UAV"), and so forth. Also, although a particular grasping end effector 182 is illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contiguity" grasping end effectors, or non-grasping end effectors.

Robot 180 and/or other robots can be utilized to perform episodes of one or more robotic tasks, and data associated with the episodes can be utilized by the real episode system 110 to generate episode data instances 150. The episode data instances 150 can be stored by the real episode system 110 in one or more computer-readable media (e.g., one or more databases). In some implementations, all or aspects of real episode system 110 can be implemented on robot 180 (e.g., via one or more processors of robot 180). In some implementations, all or aspects of real episode system 110 can be implemented on one or more computing devices that are separate from, but in network communication with, robot 180.

During each episode, the robot 180 (or another robot) is controlled to cause the robot to attempt performance of a robotic task. The control of the robot 180 during an episode can be random, pseudo-random, and/or dictated by one or more control policies. As one non-limiting example, the robotic task can be a grasping task where the robot 180 attempts to grasp one (e.g., any one) of the objects 192 utilizing the end effector 182. For instance, at the start of each episode, the robot 180 can be in a corresponding starting pose (e.g., a pseudo-randomly determined pose). At each time step of the episode, a robot action can be determined (e.g., randomly or pseudo-randomly determined) and implemented that causes the end effector 182 to move (e.g., translationally and/or rotationally). At one or more final time steps of the episode, the end effector 182 can be actuated to attempt a grasp. For instance, the two "grasping members" of the end effector 182 can be actuated to cause them to "close" (e.g., move closer together) until they are touching, are applying at least a threshold level of force, and or other criterion/criteria are satisfied.

As the robot 180 moves during an episode, sensor data is generated by sensors of the robot that indicate movement of the robot during the episode. The robot data engine 112 of system 110 utilizes such sensor data to generate robot data for the episode. For example, the robot data engine 112 can utilize the sensor data to generate trajectory data that defines a trajectory traversed by the robot during the episode. The trajectory can be defined in joint space, in task space (e.g., Cartesian space), and/or in another space. For example, the trajectory can be defined in joint space as values over time for each of the joints of the robot 180. For instance, the trajectory can define the position of each joint of the robot at a first time step of the episode, the position of each joint at a second time step of the episode, and so forth. As another example, the trajectory can be defined in task space as values over time for the end effector 182 of the robot 180. For instance, the trajectory can define the pose of the end effector 182 at a first time step of the episode, the pose of the end effector 182 at a second time step of the episode, and so forth. It is noted that in either example, the trajectory defines, directly or indirectly, the pose of the end effector 182 at each of the time steps of the episode. The robot data engine 112 can also define, as robot data, when and/or how the end effector 182 was actuated. For example, the robot data can define the pose of the claws of the end effector 182 at each of multiple time steps, torque being applied to the claws in actuating them at each of multiple time steps, etc.

The environmental data engine 114 utilizes data generated by the vision component 184 before, during, and/or after each episode, in generating environmental data for the episode. For example, the environmental data engine 114 can utilize image(s) and/or other sensor frame(s) generated by the vision component 184 immediately prior to an episode to generate environmental data that defines a beginning environmental state for the container 191 and/or for each of the objects 192 at the beginning of the episode. For example, the beginning environmental state can define a six-degree of freedom (6D) pose for the container 191 and a 6D pose for each of the objects 192 at the beginning of the episode. The environmental data engine 114 can additionally and/or alternatively determine the pose for the container 191 and 6D poses for each of the objects 192 at the end of the episode and/or at one or more times during the episode.

The environmental data engine 114 can utilize one or more techniques in determining poses of environmental objects. For example, the environmental data engine 114 can compare point cloud data generated by the vision component 184 to a stored object model of the container 191 and/or to stored object models of the objects 192 to determine 6D poses of the container 191 and/or the objects 192. For instance, in determining a 6D pose of an object, the environmental data engine 114 can match pairs of points from the point cloud data that correspond to the object to pairs of points from the stored object model of the object, determine in-plane rotations required to align the pairs of points from the point cloud data with the pairs of points from the stored object model, and determine the 6D pose based on the determined in-plane rotations.

The real success engine 116 of the real episode system 110 evaluates the success of the robotic task for each episode, and generates a real success measure for each episode based on the evaluation. Each real success measure indicates a degree of success of the robotic task for the corresponding episode. In some implementations and/or for some robotic tasks, the real success measure can be binary (i.e., successful or not successful). For example, for a grasping task the real success measure can be one of two values: a first value indicating a successful grasp or a second value indicating an unsuccessful grasp. In some other implementations and/or for some other robotic tasks, non-binary real success measures can be utilized. For example, for a robotic task of picking up an object from a first area and placing it within a separate second area, a first measure can indicate a failure to pick up the object; a second measure can indicate successfully picking up the object, but failure to place it within the separate second area; and a third measure can indicate successfully picking up the object and successfully placing it within the separate second area.

The real success engine 116 can utilize one or more techniques to determine success measures for an episode. For example, in determining whether a grasping task is successful for an episode, torque, position and/or other sensors of the end effector 182 can be monitored during the episode and/or after the episode to determine whether an object is likely successfully grasped in the episode. For instance, a successful grasp can be determined if a position sensor indicates a distance, between grasping members of the end effector 182, that is greater than some threshold (e.g., 1 cm) after attempting a grasp—and an unsuccessful grasp determined if the distance is less than some threshold (e.g., 1 cm). Also, for example, the real success engine 116 can compare image(s) (and/or other vision frame(s)) from before and after an episode of a grasping task to determine whether object(s) have moved substantially (where substantial movement can indicate a successful grasp). Also, for example, the real success engine 116 can transmit image(s) (and/or other vision frame(s)) captured during the episode to human reviewer(s), who can manually provide the success measure based on observation of the vision frame(s).

The simulator 120 is implemented by one or more computer systems and is used to simulate various environments that include corresponding environmental objects, to simulate a robot operating in the simulated environment (e.g., to simulate robot 180), to simulate responses of the robot in response to virtual implementation of various simulated robotic actions, and to simulate interactions between the simulated robot and the simulated environmental objects in response to the simulated robotic actions. Various simulators can be utilized, such as physics engines that simulates collision detection, soft and rigid body dynamics, etc. One non-limiting example of such a simulator is the BULLET physics engine.

The simulator 120 includes a configuration engine 122. The configuration engine 122 dictates various parameters of the simulator 120 that are utilized by the simulator 120 in performing simulated robot episodes. As described in more detail below, the parameters dictated by the configuration engine 122 during a given simulated episode can be adapted based on feedback from the sim modification system 130, which causes the configuration engine 122 to iteratively adapt one or more parameters based on determinations of reality measures as described herein. Various parameters can be dictated by the configuration engine 122, such as simulated robot parameters of the simulated robot and/or environmental parameters that dictate one or more properties of one or more simulated environmental objects. Simulated robot parameters can include, for example, friction coefficients for simulated gripper(s) of the simulated robot, modeling (e.g., number of joint(s)) of simulated gripper(s) of the simulated robot, control parameter(s) for the simulated gripper(s), control parameter(s) for simulated actuator(s) of the simulated robot, etc. Environmental parameters can include, for example, friction coefficient(s) for simulated environmental object(s), size and/or pose of fixed simulated environmental object(s), simulated object model(s) utilized, etc.

In adapting the parameters utilized by the simulator 120, the simulated episode engine 124 of the simulator 120 is utilized to perform simulated episodes of attempting to perform robotic task(s) based on the episode data instances 150 generated by the real episode system 110. In performing each such simulated episode, the simulated episode engine 124 retrieves one of the episode data instances 150 from the computer readable medium/media in which it is stored. The simulated episode engine 124 configures a simulated environment based on environmental data of the episode data instance. For example, the simulated episode engine 124 configures a beginning state of simulated environmental objects based on the beginning state defined by the environmental data of the episode data instance. For instance, the simulated episode engine 124 can generate a simulated version of the container 191 and simulated versions of the objects 192, and can define the initial 6D poses of those simulated environmental objects based on the 6D poses defined by the environmental data of the episode data instance.

In performing each such simulated episode, the simulated episode engine 124 further attempts to control a simulated robot to mimic the movements of the robot 180 in the corresponding episode data instance. For example, the simulated episode engine 124 can control a simulated robot to cause the simulated robot to traverse the trajectory defined by the trajectory data of the episode data instance. In these manners, in performing such a simulated episode, the simulated episode engine 124 attempts to simulate a corresponding one of the real episodes by configuring the environment based on the environmental data of the episode data instance of the real episode and by controlling the simulated robot in conformance with the robot data of the episode data instance of the real episode.

For each simulated episode that is based on a corresponding episode data instance, a sim success engine 126 of the simulator 120 evaluates the success of the robotic task for the simulated episode, and generates a simulated success measure based on the evaluation. Each simulated success measure indicates a degree of success of the robotic task for the corresponding simulated episode. The simulated success measure for a simulated episode can have the same format as the real success measure for the corresponding episode data instance on which the simulated episode is based.

The sim success engine 126 can utilize one or more techniques to determine simulated success measures for simulated episodes. For example, in determining whether a grasping task is successful for a simulated episode, the sim success engine 126 can consider the grasping task is successful if the simulator 120 indicates that, after actuating the simulated grasping members of the simulated robot, the simulated grasping members are both contacting a simulated environmental object. Also, for example, in determining whether a grasping task is successful for a simulated episode, the sim success engine 126 can evaluate success of the grasping task by causing the simulated end effector to further move, in the simulator 120, after the grasping members are closed and/or are applying force to a contacted object (if any). For example, the simulated robot can optionally be further controlled in the simulator 120 to move the end effector "up", and it can be determined if any simulated object moves with the end effector in the simulator 120. If so, the sim success engine 126 can determine the grasping task is successful for the simulated episode.

After the simulator 120 has been utilized to perform simulated episodes based on a group of episode data instances, a reality measure engine 132 of the sim modification system 130 determines a reality measure based on the simulated success measures generated by the sim success engine 126 for those simulated episodes, and based on the corresponding real success measures for the corresponding episode data instances of the group. As one example, assume one hundred simulated episodes are performed based on one hundred corresponding episode data instances. Further assume that, of the one hundred simulated episodes: the sim and real success measures are both "successful" for 40, the sim and real success measures are both "unsuccessful" for 20, the sim success measure is "successful" and the real success measure is "unsuccessful" for 19, and the sim success measure is "unsuccessful" and the real success measure is "successful" for 21. In such an example, the reality measure engine 132 can determine a reality measure of 60% based on comparison of the quantity of simulated episodes where the real and sim success measures "agree" (60) to the total quantity of simulated episodes (100). Additional and/or alternative reality measures can be determined. As one example, a reality measure of 1.5 can be determined based on a comparison of the quantity of simulated episodes where the real and sim success measures "agree" (60) to the quantity of simulated episodes where the real and sim success measures "disagree" (40). As other examples, a reality measure can be determined based on one or more of: a true positive rate, a true negative rate, a positive prediction value, a negative prediction value, a false negative rate, a false positive rate, a false discovery rate, a false omission rate, an F1 score, a Matthews correlation coefficient, an Informedness measure, and a Markedness measure.

When the reality measure determined by the reality measure engine 132 fails to satisfy a threshold and/or other criterion/criteria, the sim modification engine 134 of the sim modification system 130 can modify one or more parameters utilized by the configuration engine 122 during the simulated episodes utilized to determine the reality measure, and provide feedback to the configuration engine 122 to cause the configuration engine 122 to modify the parameters. Various parameters can be modified, such as simulated robot parameters of the simulated robot and/or environmental parameters that dictate one or more properties of one or more simulated environmental objects. The various parameters can be modified manually (e.g., based on input from a human) and/or utilizing one or more automated techniques, such as derivative free optimization (e.g., CMA-ES and/or Bayesian optimization). In manual and/or automated techniques, a quantity of parameters modified and/or extent(s) of the modification(s) can optionally be based on the reality measure. For example, derivative free optimization techniques can modify parameter(s) more aggressively when the reality measure is indicative of a relatively large reality gap, as compared to when the reality measure is indicative of a relatively smaller reality gap. For instance, a derivative free optimization technique can be utilized to iteratively adjust a friction coefficient parameter for the gripper, and the extent to which it is adjusted in a given iteration can be directly correlated to the reality measure (i.e., a relatively greater adjustment for a reality measure indicative of a relatively larger reality gap, and a relatively lesser adjustment for a reality measure indicative of a relatively smaller reality gap.

Multiple iterations of performing simulated episodes based on groups of episode data instances, determining a reality measure, and adapting parameters based on the reality measure failing to satisfy a threshold can be performed. In each of those iterations, the group of episode data instances can be the same as the group used in one or more prior iterations, or can vary (partially or fully) among multiple iterations.

When, at an iteration, the reality measure determined by the reality measure engine 132 satisfies a threshold and/or other criterion/criteria, the simulator 120 can then be utilized to perform new simulated episodes, and those new simulated episodes utilized by the simulated (sim) training example generation system 140 in generating simulated training examples 152. The new simulated episodes performed by the simulator 120 can be episodes of performing the same robotic task(s) of the episode data instances 150 utilized in adapting the parameters and/or episodes for additional robotic task(s). The new simulated episodes performed by the simulator 120 can also optionally include environmental object(s) of the episode data instances 150 utilized in adapting the parameters and/or additional and/or alternative environmental object(s).

In many implementations, one or more (e.g. all) of the new simulated episodes control the simulated robot without reference to robot data of the episode data instances 150 and/or configure a simulated environment without reference to environmental parameter(s) of the episode data instances 150. In this manner, the new simulated episodes can generate simulated data that is based on simulated robot trajectories and/or simulated environmental object configurations that vary from trajectories and/or object configurations of episode data instances. The simulated environment and/or simulated robot control during one or more (e.g., all) of the new simulated episodes can be random, pseudo-random, and/or dictated by one or more policies.

The sim training example generation system 140 utilizes simulated data generated by the simulator 120 to generate simulated training examples 152. Each of the simulated training examples 152 can be based on simulated data from one or more time steps of a new simulated episode. Such data can include, for example, simulated data that indicates a trajectory of the robot in the simulated episode, simulated data that indicates pose(s) for an end effector at one or more time steps of the simulated episode, simulated vision data that is based on the simulated episode (e.g., simulated RGB, RGBD, and/or point clouds that are "rendered" from a point of view of a simulated vision component), a simulated success measure for the simulated episode, etc.

The training engine 145 utilizes the simulated training examples 152 to train one or more machine learning models 160. For example, the training engine 145 can process training example input of a simulated training example using one of the machine learning model(s) 160, generate a predicted output based on the processing, compare the predicted output to training example output of the simulated training example, and update the machine learning model based on the comparison. For instance, determine an error based on the comparison and update the machine learning model by backpropagating the error over all or portions of the machine learning model. The training engine 145 can also optionally train one or more of the machine learning model(s) 160 utilizing one or more real training examples that are based on output from real vision sensors and/or other components of (and/or associated with) a real robot during performance of episodes by the real robot. Such real episodes can include those utilized to generate the episode data instances 150 and/or other episodes.

One non-limiting example is now provided of new simulated episodes that could be performed by the simulator 120, and simulated training examples 152 that could be generated by the sim training example generation system 140 based on such new simulated episodes. Further, a non-limiting example of training a particular machine learning model based on such simulated training examples 152 is provided.

In the non-limiting example, the new simulated episodes can include simulated episodes of grasping attempts, and can each include T separate time steps or instances. At the start of each new simulated episode, the simulated robot is in a corresponding starting pose. The starting poses can differ among various simulated episodes. For example, the starting pose of each simulated episode can be randomly or pseudo-randomly selected for each simulated episode. At each time step of the new simulated episode, a simulated robot action is determined and implemented. The simulated robot action causes an end effector of the simulated robot to move in the simulated environment. For example, the simulated robot action can cause the end effector to move translationally and/or rotationally. Each of the simulated robot actions can optionally be randomly or pseudo-randomly determined. At a final time step T, an end effector of the simulated robot is actuated to attempt a grasp. For example, for a simulated gripper end effector having two opposed "grasping members", the simulated grasping members can be actuated to cause them to "close" (e.g., move closer together). Further, for each new simulated episode a success measure of the grasping task can be determined (e.g., successful or not successful).

For each new simulated grasp episode, the sim training example generation system 140 can utilize buffered (or otherwise stored) data from the simulator 120 for the new simulated grasp episode to generate a plurality of simulated training examples. Each training example can include a rendered image (and/or other rendered vision frame(s)) for a time step of the simulated new grasp episode and a task-space motion vector from a pose of a simulated end effector at that time step to the final pose of the simulated end effector at the final time step of the simulated new grasp episode. For example, a rendered image can be rendered from a point of view of a simulated camera of the simulated robot, such as a simulated stationary camera—or a simulated non-stationary camera, such as a simulated non-stationary camera attached to one of the links of the simulated robot. Further, the rendered images for each time step can be based on data from the simulator 120 for that time step (e.g., taken from the pose of the simulated camera at that time step, and capturing the simulated robot and simulated environment at that time step). The rendered images can be, for example, two-dimensional ("2D") images with multiple color channels (e.g., red, green, and blue ("RGB")). Also, for example, the images can instead be two-and-a-half dimensional ("2.5D") images with RGB and depth channels. For the motion vector for a time step, the motion vector can be based on a transformation between the current pose of the simulated end effector at the time step and the final pose of the simulated end effector for the simulated new grasp episode. The training example output for each training example can be based on whether the corresponding new simulated grasp episode was successful (e.g., "0" or other value if not successful, and "1" or other value if successful).

Accordingly, for a successful simulated grasp episode, T positive simulated training examples can be generated, each represented by ($I_i$, $p_i$-$p_T$, L), where $I_i$ is the rendered image for a corresponding time step, $p_i$ is the pose of the end effector at the corresponding time step, $p_T$ is the pose of the end effector at the final time step (accordingly, $p_i$-$p_T$ represents an end effector motion vector for the corresponding time step), and L is a grasp success label.

The training engine 145 can train one of the machine learning model(s) 160 based on such training examples. Once trained, a "current" image captured by a real camera of a real robot, along with a candidate end effector motion vector to be implemented by the real robot, can be processed using the trained machine learning model to generate a prediction of successful grasp of an object in view of the current image and the candidate end effector motion vector. If the prediction of successful grasp indicates a likely successful grasp, the real robot can implement the candidate end effector motion vector (e.g., provide control commands to actuator(s) to cause the end effector to traverse the motion vector, then can attempt a grasp). If, on the other hand, the prediction of successful grasp indicates a likely unsuccessful grasp, an alternative end effector motion vector can be implemented (optionally after processing that vector and the current image using the machine learning model, and determining it is likely to result in a successful grasp).

Figure 2:
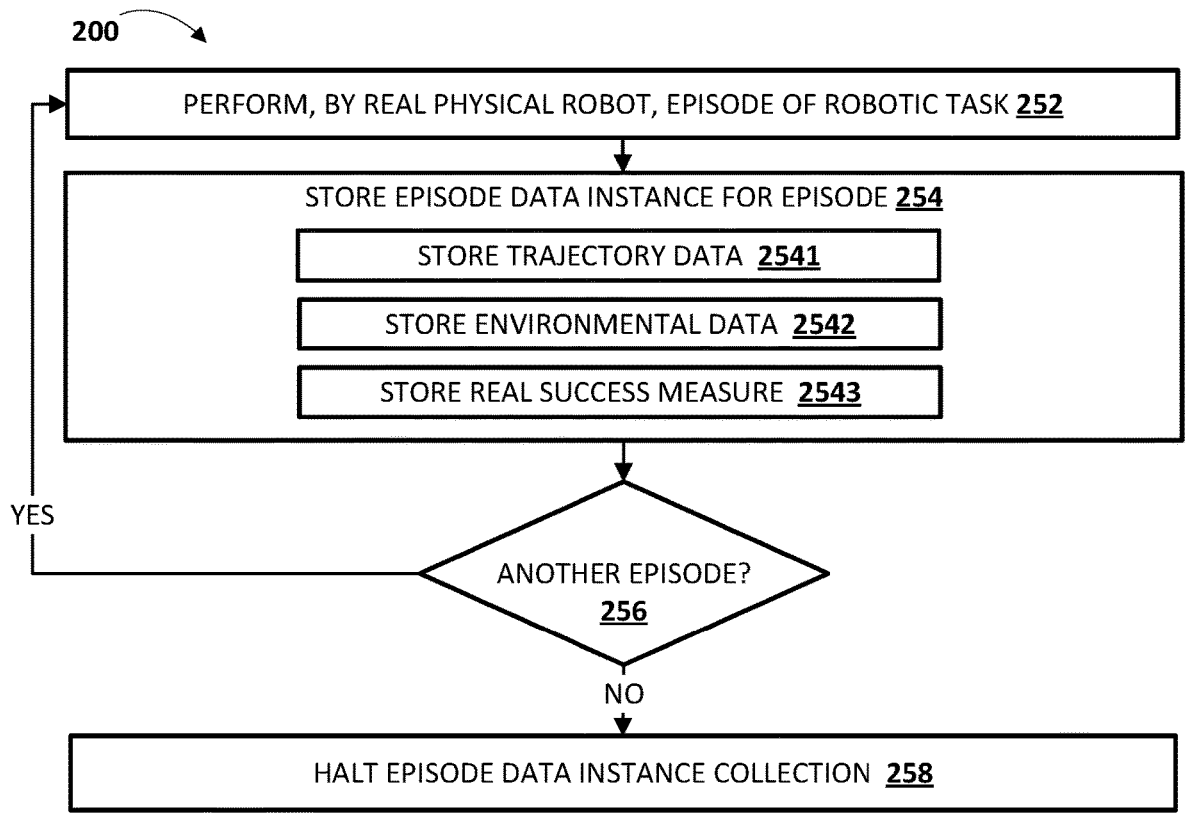
FIG. 2 is a flowchart illustrating an example method of performing real episodes of a robotic task using a real physical robot, and storing real episode data instances based on the real episodes.

Turning now to FIG. 2, an example method 200 is illustrated of performing real episodes of a robotic task using a real physical robot, and storing real episode data instances based on the real episodes. For convenience, some operations of the method 200 are described with reference to a system that performs the operations. The system can include one or more components of a robot and/or one or more components of a separate computing system. While the operations of the method 200 are shown in a particular order, this is not meant to be limiting. One or more operations may be reordered, omitted or added.

At block 252, a real physical robot performs an episode of a robotic task. The robotic task can be, for example, a manipulation task. For instance, the manipulation task can be a grasping task in which the real physical robot traverses a corresponding trajectory and attempts to interact with one or more corresponding environmental objects in an attempt to grasp the one or more environmental objects.

At block 254, the system stores an episode data instance for the episode. Block 254 can include one or more (e.g., all) of blocks 2541, 2542, and 2543.

At block 2541, the system stores trajectory data for the episode data instance. The trajectory data defines the trajectory traversed by the real physical robot during the episode. The trajectory data can be generated based on sensor data from sensors associated with one or more actuators of the real physical robot, such as positional sensor data from positional sensors associated with the actuators. The trajectory data can define the trajectory in joint space, task space, and/or other space(s).

At block 2542, the system stores environmental data for the episode data instance. The environmental data can define a beginning environmental state (e.g., 6D pose) for one or more (e.g., all) environmental objects at the start of the episode, such as environmental objects in a work space of the real physical robot during the episode. The environmental data can additionally and/or alternatively define an ending environmental state for one or more (e.g., all) of the environmental objects at an end of the episode. The environmental data can additional and/or alternatively define the environmental objects. For example, the environmental data can include, or identify, three-dimensional (3D) models for the environmental objects.

At block 2543, the system stores a real episode success measure for the episode data instance. The system can utilize one or more techniques to determine success measures for an episode. For example, in determining whether a grasping task is successful for an episode, the system can monitor torque, position and/or other sensors of an end effector of the robot during the episode and/or after the episode to determine whether an object is likely successfully grasped in the episode. Also, for example, the system can compare image(s) (and/or other vision frame(s)) from before and after an episode of a grasping task to determine whether object(s) have moved substantially (where substantial movement can indicate a successful grasp). Also, for example, the system can transmit image(s) (and/or other vision frame(s)) captured during the episode to human reviewer(s), who can manually provide the success measure based on observation of the vision frame(s).

At block 256, the system determines whether another episode is to be performed by the real physical robot and/or an additional real physical robot. If so, the system performs another iteration of block 252 and 254. The further iteration of block 252 can utilize the same real physical robot and/or can be for the same robotic task (but optionally with a different trajectory, different environmental objects, and/or different beginning state of environmental objects)—or can utilize a different robot and/or be for another robotic task.

If, at an iteration of block 256, the system determines another episode is not to be performed, the system proceeds to block 258 and halts episode data instance collection.

Figure 3:
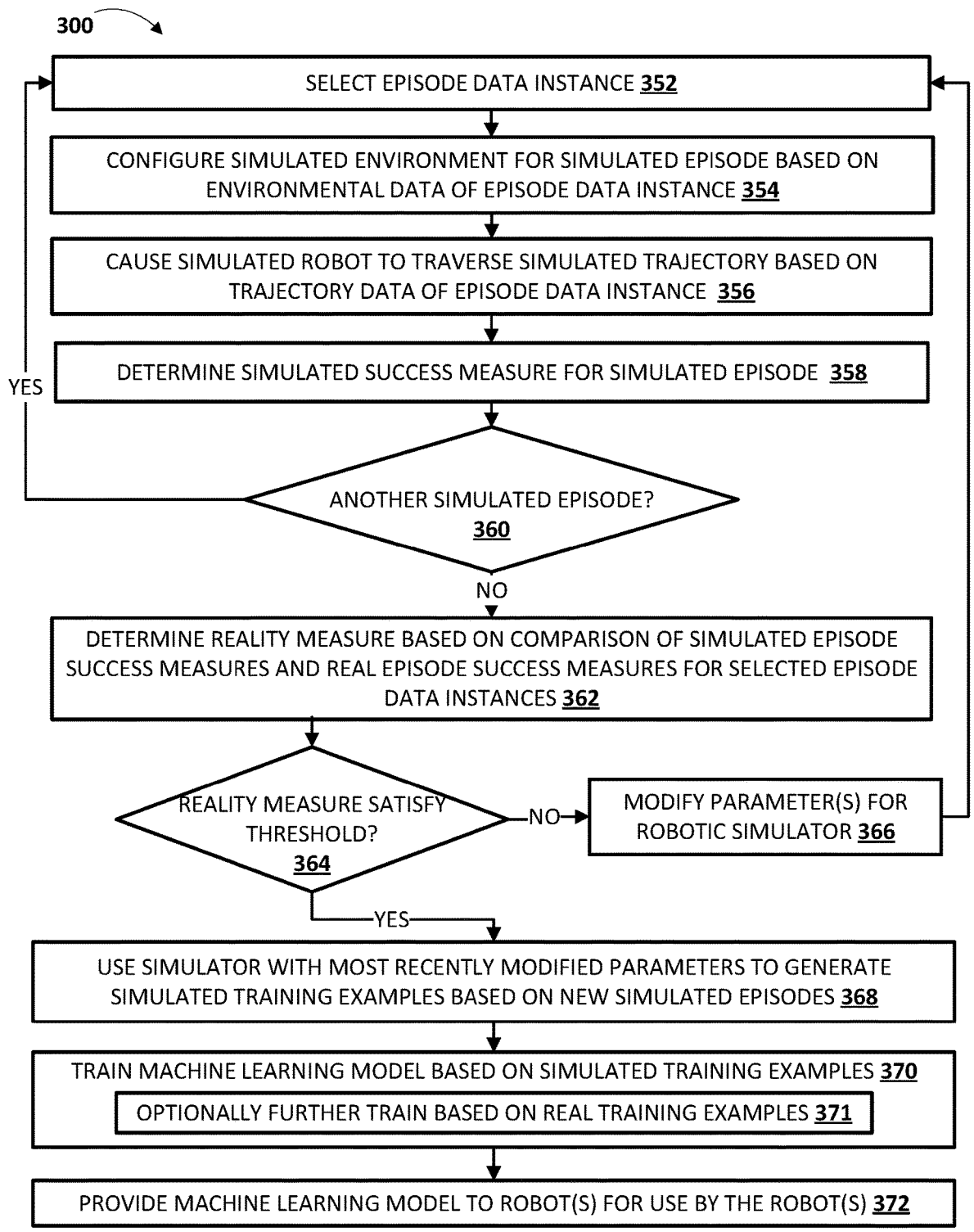
FIG. 3 is a flowchart illustrating an example method of: performing simulated episodes of a robotic task using a robotic simulator and based on corresponding real episodes; modifying parameter(s) for the robotic simulator based on one or more determined reality measures; and using the robotic simulator with modified parameters to generate simulated training examples based on a subsequent determined reality measure satisfying a threshold.

Turning now to FIG. 3, an example method 300 is illustrated of performing simulated episodes of a robotic task using a robotic simulator and based on corresponding real episodes; modifying parameter(s) for the robotic simulator based on one or more determined reality measures; and using the robotic simulator with modified parameters to generate simulated training examples based on a subsequent determined reality measure satisfying a threshold. For convenience, some operations of the method 300 are described with reference to a system that performs the operations. The system can include one or more components of one or more computing systems, such as a computing system implementing a robotic simulator. While the operations of the method 300 are shown in a particular order, this is not meant to be limiting. One or more operations may be reordered, omitted or added.

At block 352, the system selects an episode data instance, such as an episode data instance generated using method 200 of FIG. 2.

At block 354, the system configures a simulated environment for a simulated episode based on environmental data of the episode data instance. For example, the system can include, in the simulated environment, simulated objects based on those simulated objects corresponding to real world objects indicated in environmental data of the episode data instance. Also, for example, the system can determine a starting pose, for the simulated environmental objects for the simulated episode, based on starting states for the simulated environmental objects indicated in the environmental data of the episode data instance. In some implementations and/or iterations, the simulated environment can also be configured based on parameter(s) for the simulator, such as initial parameter(s) and/or parameter(s) that have been modified in one or more iterations of block 366 (described below). For example, friction coefficient(s) for environmental object(s), a size and/or pose of fixed environmental object(s), model(s) utilized in generating simulated version(s) of the environmental object(s), etc. can be configured by the system based on such parameter(s).

At block 356, the system causes the simulated robot to traverse a simulated trajectory based on trajectory data of the episode data instance. For example, the system can control the simulated robot to cause a simulated end effector and/or simulated actuators of the simulated robot to traverse a trajectory defined by the trajectory data of the episode data instance.

At block 358, the system determines a simulated episode success measure for the simulated episode. The system can utilize one or more techniques to determine a simulated success measure for a simulated episode. For example, in determining whether a grasping task is successful for a simulated episode, the system can utilize access to the ground truth state of the simulated environmental object(s) and/or the simulated robot to determine success/failure (e.g., based on the aperture of the simulated gripper and/or height of a simulated object). For instance, in determining whether a grasping task is successful for a simulated episode, the system can consider the grasping task is successful if the simulator indicates that, after actuating the simulated grasping members of the simulated robot, the simulated grasping members are both contacting a simulated environmental object. Also, for instance, in determining whether a grasping task is successful for a simulated episode, the system can evaluate success of the grasping task by causing the simulated end effector to further move, in the simulator, after the grasping members are closed and/or are applying force to a contacted object (if any), and determining if any simulated object moves with the end effector in response.

At block 360, the system determines whether another simulated episode is to be performed prior to determining a reality measure at block 362. For example, the system can perform a threshold quantity (e.g., 150, 300, or more) of simulated episodes before determining a reality measure at block 362, and can determine whether another simulated episode is to be performed based on whether the threshold quantity of simulated episodes has been performed.

If, at an iteration of block 360, the system determines another simulated episode is to be performed, the system returns to block 352, selects an additional episode data instance, performs an additional simulated episode at blocks 354 and 356 based on the additional episode data instance, and determines a simulated episode success measure for the additional simulated episode at block 358.

If, at an iteration of block 360, the system determines another simulated episode is not to be performed, the system proceeds to block 362. At block 362, the system determines a reality measure based on comparison of: (i) simulated episode success measures determined in the iterations of block 358 since a last iteration (if any) of block 362; and (ii) their corresponding real success measures.

One example of block 362 is described with reference to FIG. 4. In FIG. 4, a confusion matrix is illustrated and includes four separate blocks. The top-left block A represents a quantity of occurrences of simulated episodes in which: the simulated episode success measure determined at block 358 (since a last iteration (if any) of block 362) for the simulated episode indicated the robotic task was "not successful" and the real success measure of the real episode data instance on which the simulated episode was based also indicated the robotic task was "not successful". The bottom-right block D represents a quantity of occurrences of simulated episodes in which: the simulated episode success measure determined at block 358 (since a last iteration (if any) of block 362) for the simulated episode indicated the robotic task was "successful" and the real success measure of the real episode data instance on which the simulated episode was based also indicated the robotic task was "successful". The top-right block B represents a quantity of occurrences of simulated episodes in which: the simulated episode success measure determined at block 358 (since a last iteration (if any) of block 362) for the simulated episode indicated the robotic task was "not successful", but the real success measure of the real episode data instance on which the simulated episode was based instead indicated the robotic task was "successful". The bottom-left block C represents a quantity of occurrences of simulated episodes in which: the simulated episode success measure determined at block 358 (since a last iteration (if any) of block 362) for the simulated episode indicated the robotic task was "successful", but the real success measure of the real episode data instance on which the simulated episode was based instead indicated the robotic task was "not successful". Accordingly, blocks A and D indicate a quantity of occurrences where the real and simulated success measures agree, and blocks B and C indicate a quantity of occurrences where the real and simulated success measures are in conflict. As illustrated in FIG. 4, one option for determining the reality measure based on such a confusion matrix is dividing the quantity of occurrences where the real and simulated success measures agree ("A+D") by the total quantity of simulated episodes (indicated by "A+B+C+D").

After block 362, the system proceeds to block 364. At block 364, the system determines whether the reality measure satisfies a threshold and/or other criterion/criteria. As one non-limiting example, the threshold can be greater than 90%, using the equation of FIG. 4. If not, the system proceeds to block 366 and modifies one or more parameters for the simulator.

At block 366, the system modifies one or more parameters for a robotic simulator. As described herein, which parameters are modified, and/or the extent(s) of modification(s) can optionally be based on the reality measure. After block 366, the system again performs multiple iterations of blocks 352, 354, 356, 358, and 360 utilizing the parameters for the simulator, as modified in the most recent iteration of block 366. The system will then perform an additional iteration of block 362, and again perform another iteration of block 364.

If, at an iteration of block 364, the system determines the reality measure satisfies the threshold and/or other criteria/criterion, the system proceeds to block 368.

At block 368, the system uses the simulator with the most recently modified parameters to generate simulated training examples based on new simulated episodes.

At block 370, the system trains a machine learning model based on the simulated training examples generated at block 368. In some implementations, the system also performs block 371, where the system further trains the model based on real training examples, where the real training examples are based on data generated by sensor(s) of one or more real physical robots. In some implementations, block 370 can include one or more blocks of method 500, described in more detail below.

At block 372, the system provides the machine learning model, as trained, to one or more robots for use by the robot(s). For example, a control system of a robot can use the machine learning model in controlling one or more actuators and/or other component(s) of the robot. For instance, the trained machine learning model can be trained to be used in processing of data to generate a predicted output, such as processing sensor data from one or more sensors of a robot (e.g., vision sensor(s), position sensor(s), torque sensor(s)), to generate predicted output that dictates one or more future movements of the robot. The robot can process such data, using the trained machine learning model, to generate predicted output, and generate one or more control commands to provide to actuator(s), based at least in part on the predicted output.

Figure 5:
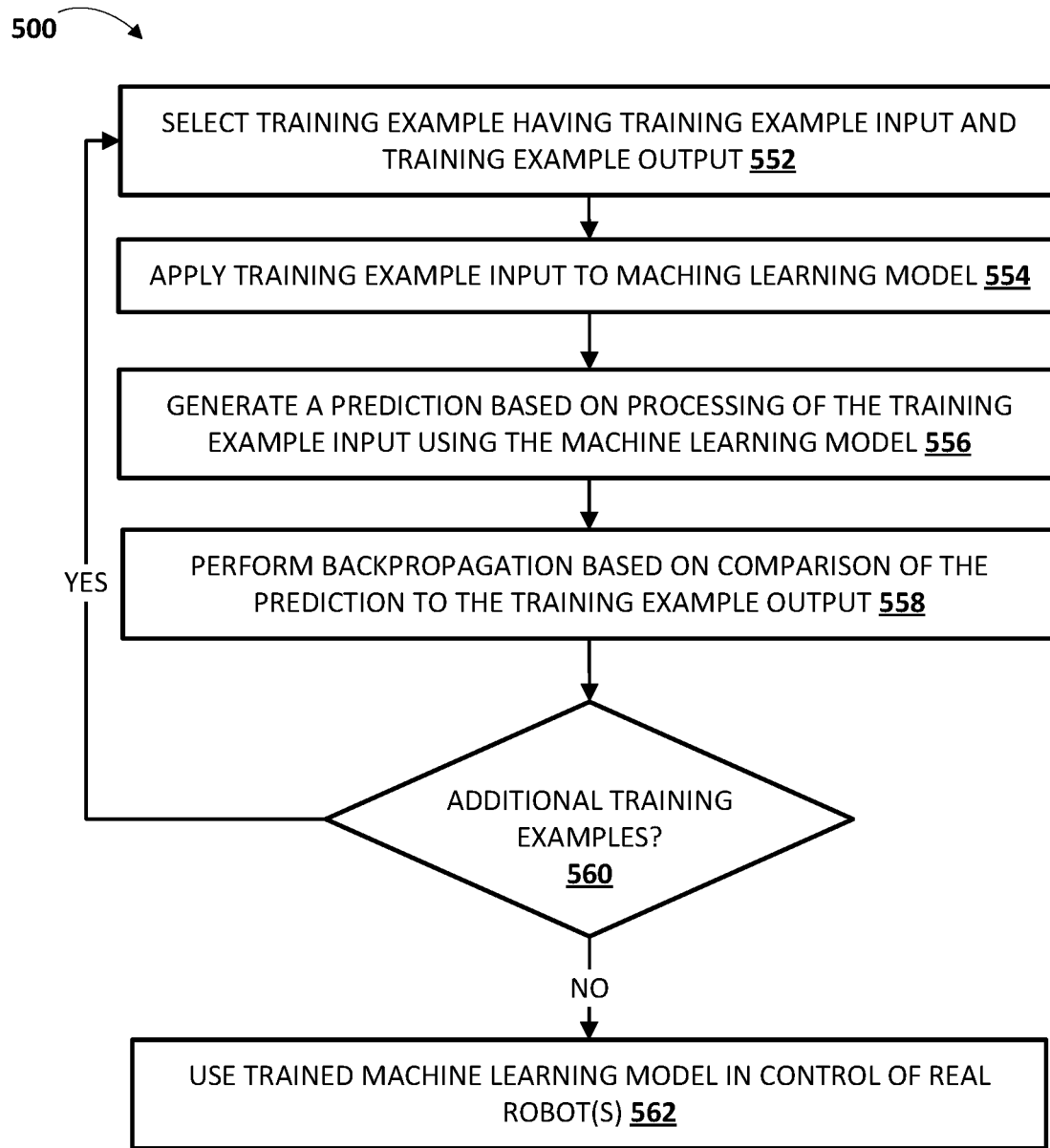
FIG. 5 is a flowchart illustrating an example method of training a machine learning model using simulated training examples that are generated using a robotic simulator with parameter(s) adapted based on a reality measure according to implementations described herein.

Turning now to FIG. 5, an example method 500 is illustrated of training a machine learning model using simulated training examples that are generated using a robotic simulator with parameter(s) adapted based on a reality measure. For convenience, some operations of the method 500 are described with reference to a system that performs the operations. The system can include one or more components of one or more computing systems. While the operations of the method 500 are shown in a particular order, this is not meant to be limiting. One or more operations may be reordered, omitted or added.

At block 552, the system selects a training example having training example input and training example output. In some implementations and/or iterations, the training example selected at block 552 is a simulated training example, such as a simulated training example generated at block 366 of method 300 of FIG. 3. In some iterations, the training example selected at block 552 can be a real training example.

At block 554, the system applies the training example input to a machine learning model.

At block 556, the system generates a prediction based on processing of the training example input using the machine learning model.

At block 558, the system performs backpropagation based on comparison of the prediction to the training example output. For example, the system can determine an error based on the comparison, and backpropagate the error over all or portions of the machine learning model.

At block 560, the system determines whether further training based on additional training examples should occur. If so, the system can proceed back to block 552, select an additional training example, and further train the machine learning model based on the additional training example. In some implementations, determining whether further training should occur includes determining whether there are any remaining unprocessed training examples (real and/or simulated). In some implementations, determining whether further training should occur may additionally and/or alternatively include determining whether training has been performed based on a threshold quantity of simulated training examples and/or based on a threshold quantity of real training examples.

If the system determines at block 560, that further training should not occur, the system proceeds to block 562 and uses the trained machine learning model in the control of one or more real robots. For example, the trained machine learning model can be stored locally on one or more computer readable media of a real robot, and utilized by a control system of the real robot in one or more aspects of control of the real robot by the control system.

Figure 6:
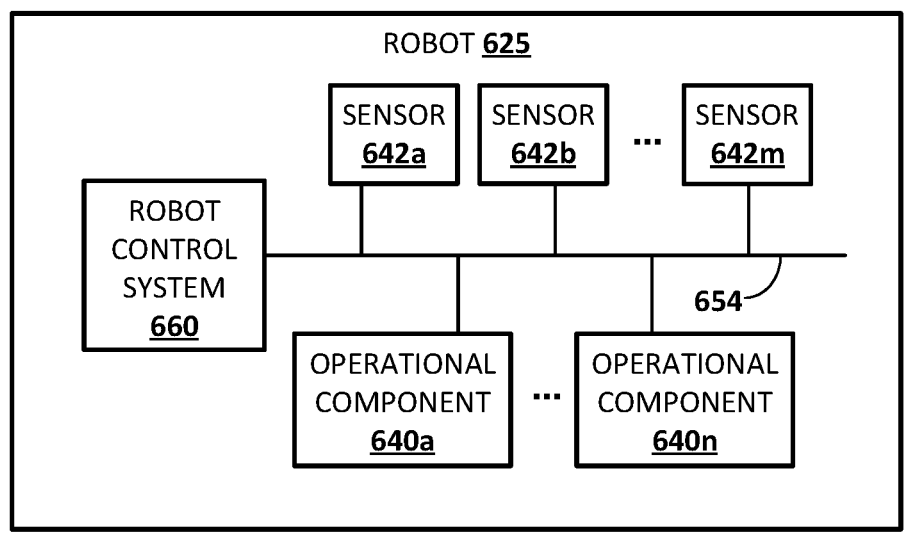
FIG. 6 schematically depicts an example architecture of a robot.

FIG. 6 schematically depicts an example architecture of a robot 625. The robot 625 includes a robot control system 660, one or more operational components 625a-625n, and one or more sensors 642a-642m. The sensors 642a-642m may include, for example, vision components, light sensors, pressure sensors, pressure wave sensors (e.g., microphones), proximity sensors, accelerometers, gyroscopes, thermometers, barometers, and so forth. While sensors 642a-m are depicted as being integral with robot 625, this is not meant to be limiting. In some implementations, sensors 642a-m may be located external to robot 625, e.g., as standalone units.

Operational components 625a-625n may include, for example, one or more end effectors and/or one or more servo motors or other actuators to effectuate movement of one or more components of the robot. For example, the robot 625 may have multiple degrees of freedom and each of the actuators may control actuation of the robot 625 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 625. In some implementations, the robot 625 may comprise a "brain box" that may include all or aspects of the control system 660. For example, the brain box may provide real time bursts of data to the operational components 625a-n, with each of the real time bursts comprising a set of one or more control commands that dictate, inter alia, the parameters of motion (if any) for each of one or more of the operational components 625a-n. In some implementations, the robot control system 660 may perform one or more aspects of one or more methods described herein.

As described herein, in some implementations all or aspects of the control commands generated by control system 660 can be generated based on a machine learning model that is trained, in whole or in part, based on simulated training examples generated according to techniques described herein. As one non-limiting example, control commands generated in positioning an end effector to grasp a target object may be based on end effector commands generated based on output generated over such a machine learning model. For instance, a vision component of the sensors 642a-m may capture a current image (and optionally an additional image), and the robot control system 660 may generate a candidate motion vector. The robot control system 660 may process the current image, optionally the additional image, and the candidate motion vector utilizing a trained machine learning model to generate a prediction of successful grasp, and based on the prediction can generate one or more end effector control commands for controlling the movement and/or grasping of an end effector of the robot. Although control system 660 is illustrated in FIG. 6 as an integral part of the robot 625, in some implementations, all or aspects of the control system 660 may be implemented in a component that is separate from, but in communication with, robot 625. For example, all or aspects of control system 660 may be implemented on one or more computing devices that are in wired and/or wireless communication with the robot 625, such as computing device 710.

Figure 7:
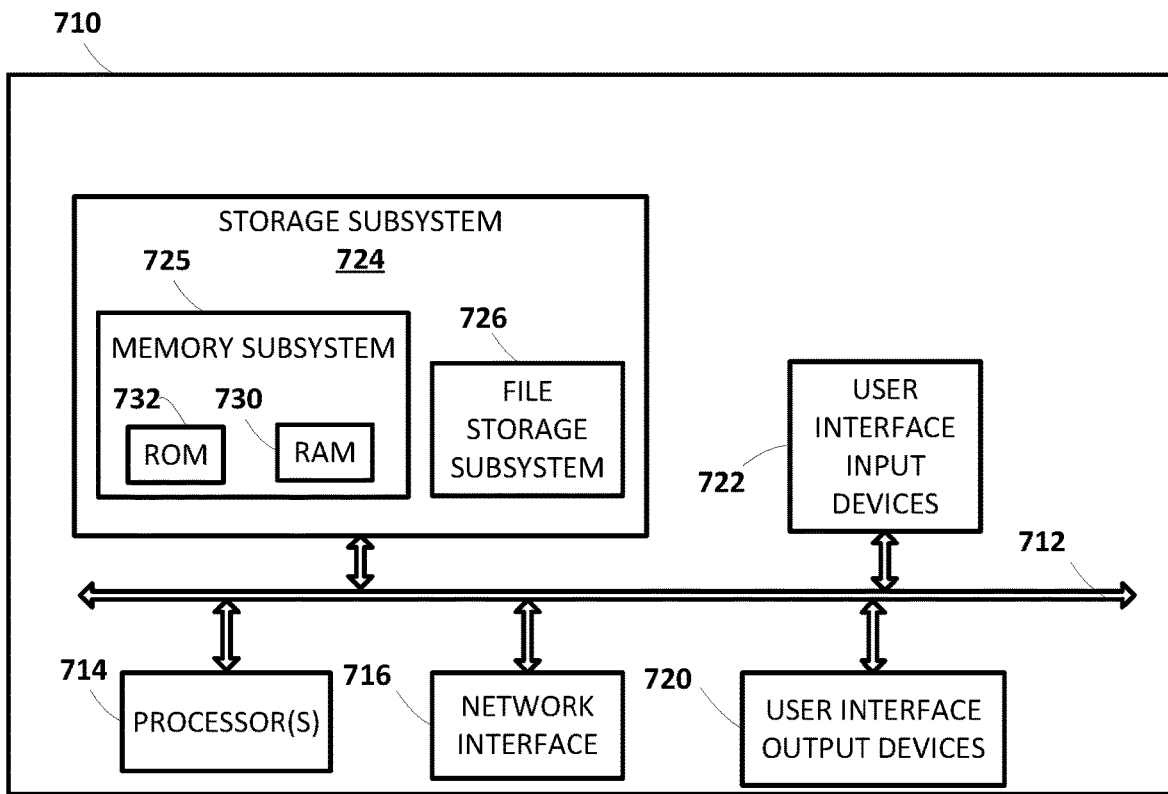
FIG. 7 schematically depicts an example architecture of a computer system.

FIG. 7 is a block diagram of an example computing device 710 that may optionally be utilized to perform one or more aspects of techniques described herein. For example, in some implementations computing device 710 may be utilized to execute simulator 120, sim modification system 130, real episode system 110, sim training example system 140, and/or training engine 145. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

What is claimed is:

1. A method, comprising:
    accessing real episode data instances stored in one or more computer-readable media, each of the real episode data instances generated based on performance of a corresponding real episode of a robotic task by a corresponding real robot to cause the corresponding real robot to traverse a corresponding trajectory and attempt to interact with one or more corresponding environmental objects in attempting performance of the robotic task;
    performing, using a robotic simulator with current parameters, simulated episodes of attempting performance of the robotic task based on the real episode data instances of the real episodes, wherein during each of the simulated episodes:
        a simulated environment is configured based on a corresponding one of the real episode data instances of the group, and
        a simulated robot is controlled based on the corresponding one of the real episode data instances of the group;
    determining a reality measure for the simulated episodes based on comparison of the simulated episodes to the real episodes;
    determining whether the reality measure satisfies one or more criteria;
    when it is determined that the reality measure fails to satisfy the one or more criteria:
        modifying one or more of the current parameters for the robotic simulator;
    when it is determined that the reality measure satisfies the threshold:
        performing, using the robotic simulator with the current parameters, new simulated episodes that are not based on the episode data instances;
        generating simulated training data based on the new simulated episodes; and
        transmitting the simulated training data for training of a machine learning model based on the simulated training data.

2. The method of claim 1, further comprising:
    performing, prior to the simulated episodes of the robotic task based on the real episode data instances of the group, one or more prior simulated episodes of attempting performance of the robotic task using the robotic simulator, wherein each of the prior simulated episodes is based on a corresponding real episode data instance of the real episodes;
    determining, for the prior simulated episodes, a prior reality measure based on comparison of the prior simulated episodes and the real episode success to the real episodes;
    in response to determining that the prior reality measure fails to satisfy the one or more criteria, modifying prior parameters of the robotic simulator to generate the current parameters.

3. The method of claim 2, wherein modifying the prior parameters for the robotic simulator comprises modifying one or more simulated robot parameters of the simulated robot.

4. The method of claim 3, wherein the one or more simulated robot parameters comprise a gripper parameter that dictates simulated control of a simulated gripper of the simulated robot simulated by the robotic simulator.

5. The method of claim 2, wherein modifying the prior parameters for the robotic simulator comprises modifying one or more environmental parameters that dictate one or more properties of one or more simulated environmental objects simulated by the robotic simulator.

6. The method of claim 5, wherein the one or more properties of the one or more simulated environmental objects include friction coefficients.

7. The method of claim 1, further comprising:
    training the machine learning model based on the simulated training data.

8. The method of claim 7, further comprising:
    processing robot data using the trained machine learning model to generate a predicted output, the robot data based on output from one or more sensors of an additional real robot; and
    controlling the additional real robot based on the predicted output.

9. The method of claim 1, wherein determining the reality measure for the simulated episodes comprises generating a confusion matrix that is based on simulated success measures for the simulated episodes and real success measures for the real episodes.

10. The method of claim 1, wherein the real episodes and the simulated episodes are performed without use of the machine learning model,
in response to determining that the additional reality measure satisfies the threshold:
using the robotic simulator, with the modified one or more parameters, for one or more additional purposes.

11. A system, comprising:
memory storing instructions;
processors operable to execute the instructions to:
access real episode data instances stored in one or more computer-readable media, each of the real episode data instances generated based on performance of a corresponding real episode of a robotic task by a corresponding real robot to cause the corresponding real robot to traverse a corresponding trajectory and attempt to interact with one or more corresponding environmental objects in attempting performance of the robotic task;
perform, using a robotic simulator with current parameters, simulated episodes of attempting performance of the robotic task based on the real episode data instances of the real episodes, wherein during each of the simulated episodes:
a simulated environment is configured based on a corresponding one of the real episode data instances of the group, and
a simulated robot is controlled based on the corresponding one of the real episode data instances of the group;
determine a reality measure for the simulated episodes based on comparison of the simulated episodes to the real episodes;
determine whether the reality measure satisfies one or more criteria;
when it is determined that the reality measure fails to satisfy the one or more criteria:
modify one or more of the current parameters for the robotic simulator;
when it is determined that the reality measure satisfies the threshold:
use the robotic simulator, with the modified one or more parameters, for one or more additional purposes.

12. The system of claim 11, wherein one or more of the processors are further operable to execute the instructions to:
perform, prior to the simulated episodes of the robotic task based on the real episode data instances of the group, one or more prior simulated episodes of attempting performance of the robotic task using the robotic simulator, wherein each of the prior simulated episodes is based on a corresponding real episode data instance of the real episodes;
determine, for the prior simulated episodes, a prior reality measure based on comparison of the prior simulated episodes and the real episode success to the real episodes;
in response to determining that the prior reality measure fails to satisfy the one or more criteria, modify prior parameters of the robotic simulator to generate the current parameters.

13. The system of claim 12, wherein, in modifying the prior parameters for the robotic simulator, one or more of the processors are to modify one or more simulated robot parameters of the simulated robot.

14. The system of claim 13, wherein the one or more simulated robot parameters comprise a gripper parameter that dictates simulated control of a simulated gripper of the simulated robot simulated by the robotic simulator.

15. The system of claim 13, wherein, in modifying the prior parameters for the robotic simulator, one or more of the processors are to modify one or more environmental parameters that dictate one or more properties of one or more simulated environmental objects simulated by the robotic simulator.

16. The system of claim 12, wherein, in modifying the prior parameters for the robotic simulator, one or more of the processors are to modify one or more environmental parameters that dictate one or more properties of one or more simulated environmental objects simulated by the robotic simulator.

17. The method of claim 16, wherein the one or more properties of the one or more simulated environmental objects include friction coefficients.

18. The system of claim 11, wherein the one or more additional purposes comprise performing, using the robotic simulator with the current parameters, new simulated episodes that are not based on the episode data instances.

19. The system of claim 11, wherein, in determining the reality measure for the simulated episodes, one or more of the processors are to generate a confusion matrix that is based on simulated success measures for the simulated episodes and real success measures for the real episodes.

20. The system of claim 11, wherein the real episodes and the simulated episodes are performed without use of the machine learning model.

* * * * *